United States Patent
Pierre

(10) Patent No.: US 10,472,119 B2
(45) Date of Patent: Nov. 12, 2019

(54) CONTAINER MADE FROM THERMOPLASTIC MATERIAL HAVING A PETALOID BOTTOM WITH INCREASED BLOW-MOLDABILITY

(71) Applicant: SIDEL PARTICIPATIONS, Octeville-sur-Mer (FR)

(72) Inventor: Ivan Pierre, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 424 days.

(21) Appl. No.: 15/029,940

(22) PCT Filed: Oct. 23, 2014

(86) PCT No.: PCT/FR2014/052701
§ 371 (c)(1),
(2) Date: Apr. 15, 2016

(87) PCT Pub. No.: WO2015/071565
PCT Pub. Date: May 21, 2015

(65) Prior Publication Data
US 2016/0229579 A1  Aug. 11, 2016

(30) Foreign Application Priority Data

Nov. 15, 2013 (FR) .................................. 13 61210

(51) Int. Cl.
*B65D 1/02* (2006.01)
*B29C 49/06* (2006.01)

(52) U.S. Cl.
CPC ............ *B65D 1/0284* (2013.01); *B29C 49/06* (2013.01)

(58) Field of Classification Search
CPC .......... A63H 33/28; B65D 1/0284; B65D 1/16
USPC ....................................................... 215/375
See application file for complete search history.

(56) References Cited

U.S. PATENT DOCUMENTS

| 2010/0119643 A1 | 5/2010 | Boukobza |
| 2013/0043255 A1 | 2/2013 | Boukobza |
| 2013/0264305 A1* | 10/2013 | Boukobza ............ B65D 1/0284 |
| | | 215/375 |
| 2014/0227399 A1 | 8/2014 | Wortmann et al. |

(Continued)

FOREIGN PATENT DOCUMENTS

| EP | 2 764 979 A1 | 8/2014 |
| WO | 2009/092930 A2 | 7/2009 |
| WO | 2011/131893 A1 | 10/2011 |

OTHER PUBLICATIONS

International Search Report, dated Mar. 10, 2015, from corresponding PCT Application.

*Primary Examiner* — Anthony D Stashick
*Assistant Examiner* — Raven Collins

(57) ABSTRACT

A container (1) made from thermoplastic material obtained by blow molding, or stretch-blow molding, includes a body (2) and a petaloid bottom (5) that has a central area (7) from which feet (6) extend radially, alternating with valleys (10), each foot (6) including a peripheral portion (11) connected to the body (2) of the container and a central portion (12) connected to the central area (7), the container being characterized in that each foot further has a truncated portion (13) forming a seat for the container (1), extending between the peripheral portion (11) and the central portion (12).

12 Claims, 7 Drawing Sheets

(56) References Cited

U.S. PATENT DOCUMENTS

2016/0167825 A1\* 6/2016 Dachs .................. B65D 1/0284
  215/375

\* cited by examiner

CONTAINER MADE FROM THERMOPLASTIC MATERIAL HAVING A PETALOID BOTTOM WITH INCREASED BLOW-MOLDABILITY

BACKGROUND OF THE INVENTION

Field of the Invention

The invention relates to the field of containers made of plastic material, such as bottles, obtained by a process of injecting a preform, and then blow molding or stretch blow molding the heated preform. More specifically, the invention relates to such a container that is designed to contain a gaseous product, such as a carbonated liquid, and whose bottom is configured for this purpose.

In a conventional manner, a container comprises a body, extending along a main axis, provided at an upper end with a spout, in general called a neck, connected to the body by a shoulder, and closed at the lower end by a bottom. The bottom of a container that is designed to contain a gaseous liquid is called in general a petaloid bottom, because it has a series of feet projecting toward the outside of the container, in the form of petals, alternating with valleys, separating the feet. This configuration of the bottom has as its object in particular to stiffen it in order to make it more resistant than a flat bottom in relation in particular to the pressure of gas dissolved in the liquid and that applies mechanical stresses on the bottom. The points of the feet in contact with the surface on which the container rests thus form a seat for the container, while the valleys absorb the stresses.

The different surfaces that form the body and the bottom of the container are obtained by rotation of generatrix curves around the main axis, so as to preserve a general cylindrical shape around the main axis.

The petaloid shape certainly makes it possible to stiffen the bottom. However, it creates difficulties during the blow-molding or stretch-blow-molding manufacturing process.

The manufacturing process consists in particular in placing a heated preform in a mold, whose walls can also be heated, and then in injecting therein compressed air (blow molding) and optionally stretching the material to the bottom of the mold using a rod (stretching) simultaneously with the blow molding. The preform swells and stretches under the action of air and optionally the rod, and the material is flattened against the walls of the mold and then sets to form the container. Blow-moldability refers to the capacity of a container to be formed by blow molding: the higher the blow-moldability, the easier the container is to blow mold; i.e., it requires a lower blow-molding pressure and a shorter dwell time in the mold.

However, the material first comes into contact with the impression of the valleys, made on the mold bottom, where it tends to set in such a way that the blow-moldability of the bottom is decreased starting from this contact. The subsequent expansion of the material for reaching the feet is impacted, and the thickness in the area of the feet is often smaller than the thickness in the area of the valleys. The rigidity of the bottom is decreased in an undesirable manner.

Description of the Related Art

To eliminate this drawback, it is known either to increase the blow-molding pressure, which is energy-intensive, or to increase the blow-molding time for allowing the material more time to flow to the feet, which decreases the production rates.

The document WO 2009/092930, in the name of the applicant, explains this problem in more detail and proposes a solution that is linked to the shape of the valleys, facilitating the flow of the material toward the feet.

Another solution consists in decreasing the placement diameter of the container, i.e., the diameter of the seat. Actually, with a lower blow-molding pressure or a shorter blow-molding time, the material of the preform is then more easily deformed by the blow molding, which makes it possible to reach the portion of the mold corresponding to the feet more easily.

However, this solution is limited. Actually, the stability of the container resting on the feet is directly linked to the placement diameter: the larger this diameter, the better the stability. The placement diameter can therefore be reduced only by making a compromise between stability and blow-moldability.

BRIEF SUMMARY OF THE INVENTION

There is therefore a need for a new container having a bottom that provides a solution to the above-mentioned drawbacks, making it possible to increase the blow-moldability, while ensuring satisfactory stability.

A first object of the invention is to propose a container made of thermoplastic material whose blow-moldability is improved.

A second object of the invention is to propose a container made of thermoplastic material whose stability is preserved.

A third object of the invention is to propose a container made of thermoplastic material that has a rigid bottom, particularly adapted so that the container contains a gaseous liquid.

Thus, the invention proposes a container made of thermoplastic material that is obtained by blow molding or stretch blow molding of a previously-injected preform, with the container comprising a body extending along a main axis and comprising a petaloid-type bottom that has a central zone from which feet alternating with valleys extend radially, with each foot comprising a peripheral portion connected to the body of the container and a central portion connected to the central zone, with the container being characterized in that each foot also has a truncated portion, forming a seat for the container and extending between the peripheral portion and the central portion, with the truncated portion comprising a surface for connecting to the peripheral portion, a surface for connecting to the central portion, and an intermediate surface connecting the two connecting surfaces, with the intermediate surface being defined by the rotation of at least one generatrix curve around a truncation axis that is different from the main axis and specific to each foot, with the radius of curvature of the curve of the intermediate surface being larger than the radius of curvature of the generatrix curves of the connecting surfaces.

According to other characteristics taken by themselves or in combination:
  The truncation axis is inclined in relation to the main axis;
  The truncation axis is inclined by an angle of inclination in relation to the main axis of between 0° and 65°;
  The angle of inclination is 40°;
  The radius of curvature of the generatrix curve of the intermediate surface is not constant;
  The radius of curvature of the generatrix curve of the intermediate surface is at least 10 mm;
  The radius of curvature of the generatrix curve of the intermediate surface is 28 mm;

The radius of curvature of the generatrix curve of the intermediate surface is infinite, with the generatrix curve of the surface being considered as a straight line;

The ratio between the radius of curvature of the generatrix curve of the intermediate surface and the radius of curvature of each generatrix curve of the connecting surfaces is at least eight.

BRIEF DESCRIPTION OF THE DRAWINGS

Other characteristics and advantages will be brought out in the description of particular embodiments of the invention, accompanied by figures in which.

DETAILED DESCRIPTION OF THE PREFERRED EMBODIMENTS

Figure 1:
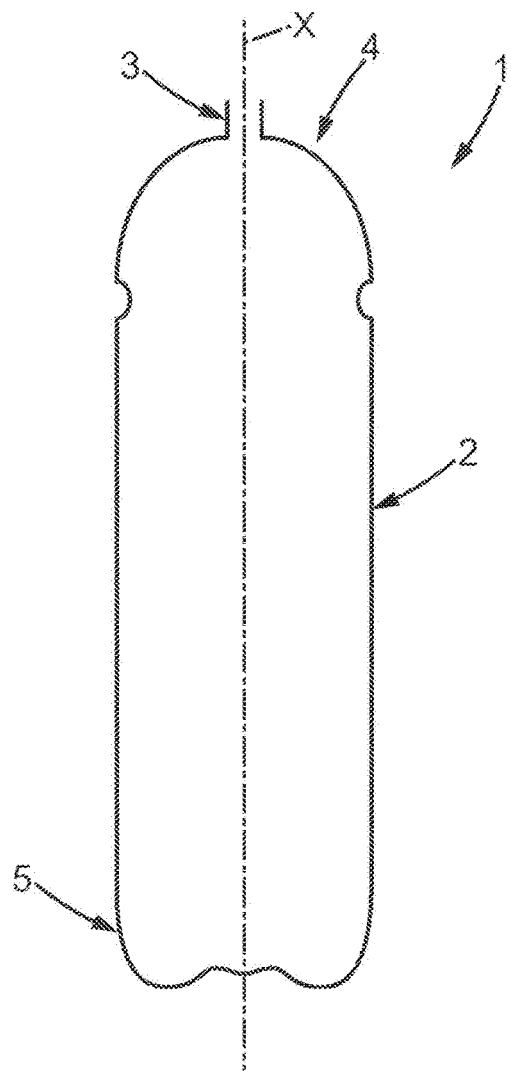
FIG. 1 is a diagrammatic representation of the cross-sectional profile of a container, along a plane that comprises a main axis X, with the container being provided with a bottom according to the invention.
Figure 2:
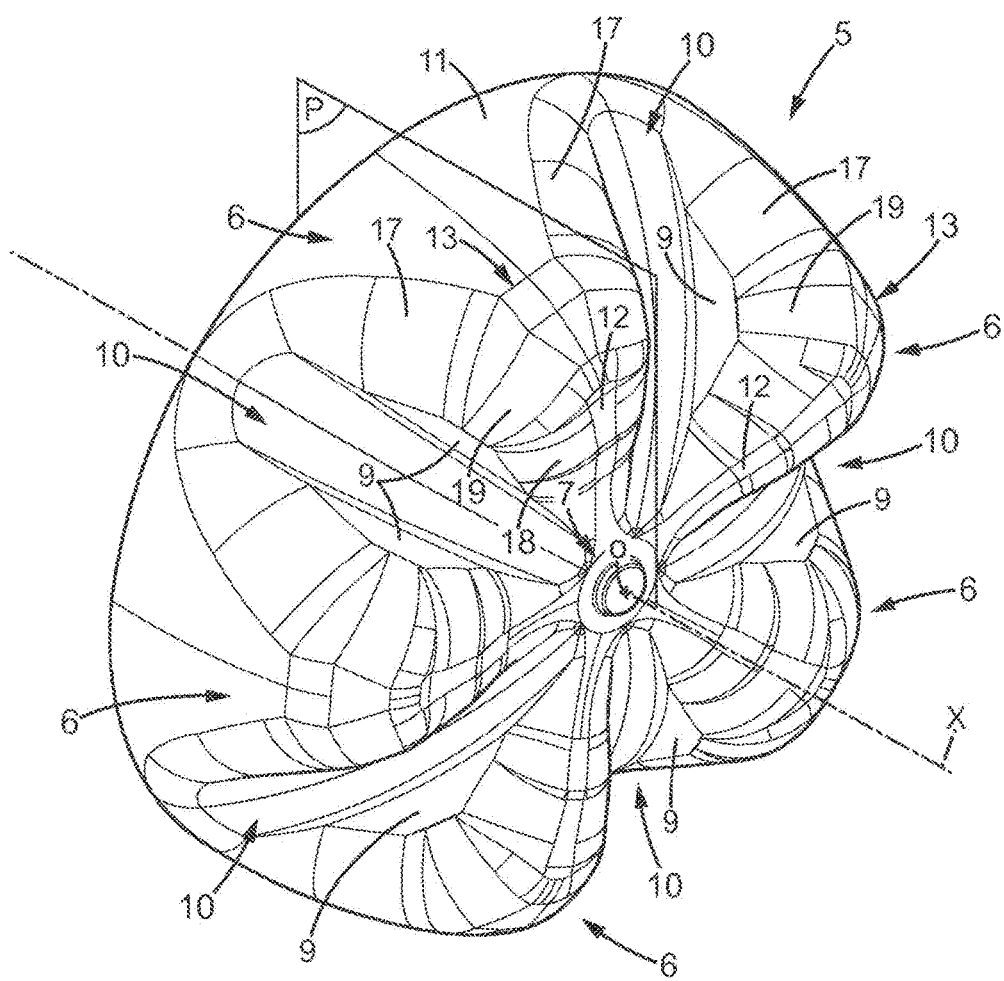
FIG. 2 is a three-dimensional view of three-quarters of the bottom of the container of FIG. 1.

In FIG. 1, a container 1 of the bottle type, designed in particular to contain a gaseous liquid, is shown. The container is made of a thermoplastic material, such as PET, by blow molding or stretch blow molding. The container 1 comprises a hollow body 2 that extends along a main axis X, whose wall is obtained by the revolution of one or more generatrix curves around the main axis X. A neck 3 (or spout) is placed at an upper end of the body 2 and connected to the body 2 by a shoulder 4. The body 2 is closed at its lower end by a bottom 5.

The bottom 5 is of the petaloid type. It comprises feet 6 projecting along the main axis X that extend radially from a central zone 7 of the bottom 5, which zone comprises a projecting peg 8. The center of the bottom 5 is marked O, with the main axis X passing through the center O. Each foot 6 is defined between two lateral sides 9 that flank it and that are inclined in relation to a radial plane P of the foot 6 by an angle that ranges from, for example, 10° to 30°, for facilitating the blow molding.

The feet 6 are placed alternating with valleys 10, forming hollows between two sides 9 that face one another, with the valleys 10 also extending radially from the central zone 7.

The number of valleys 10 is equal to the number of feet 6. The number of feet 6 and valleys 10 is at least equal to three, and in practice, as well as according to the embodiment presented in the figures, is equal to five.

Figure 3:
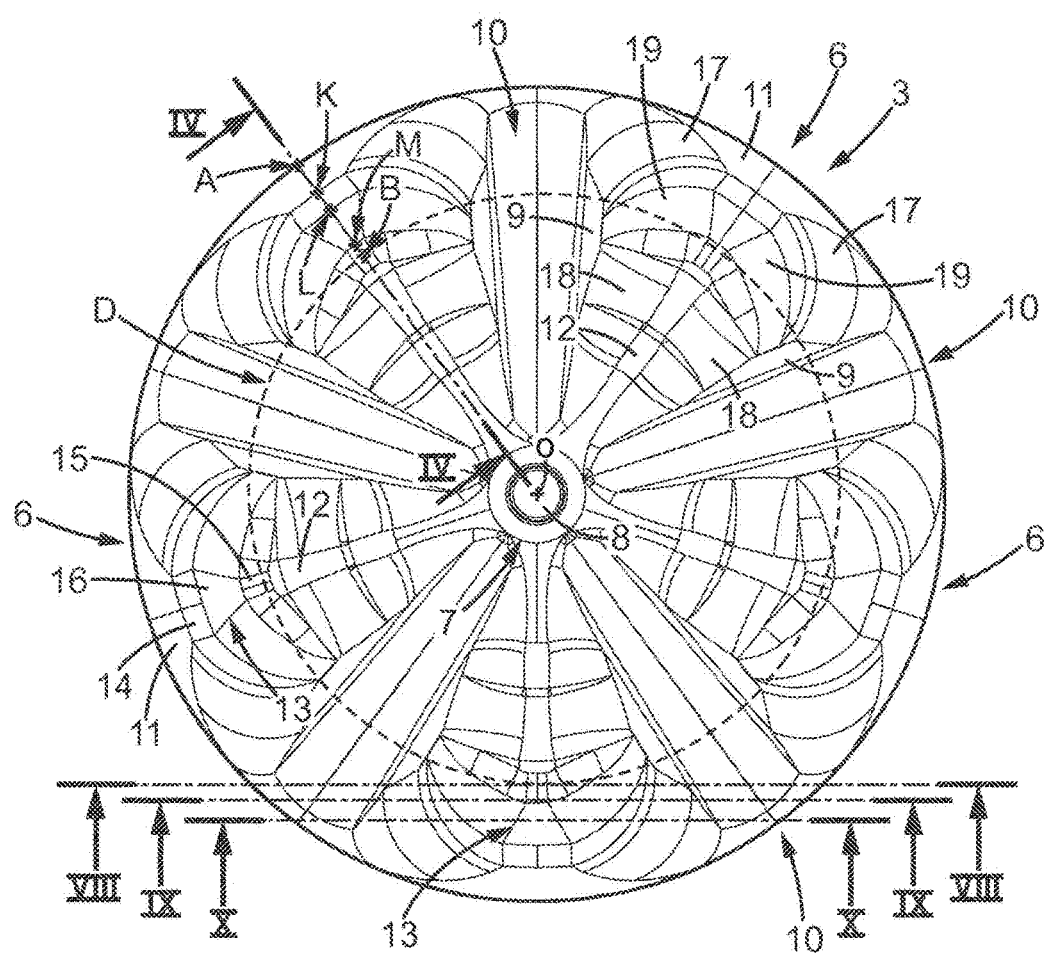
FIG. 3 is a bottom view of the container bottom of FIG. 2.

Each foot 6 is defined, when seen in radial cutaway, in a direction parallel to the main axis X, between two points A and B. The first point A is placed at the junction between the bottom 5 and the body 2, with the second point B, the so-called seat, being the furthest projecting point of the bottom 5, i.e., the point on which the container 1 rests when it is placed on its bottom 5. Preferably, all of the points B are distributed along a seat circle D, shown in FIG. 3, whose center coincides with the center O of the bottom 5. The circle D, and more precisely its radius, influences the stability of the container 1. Actually, the larger the radius of the seat circle D, the better the stability of the container 1.

Figure 4:
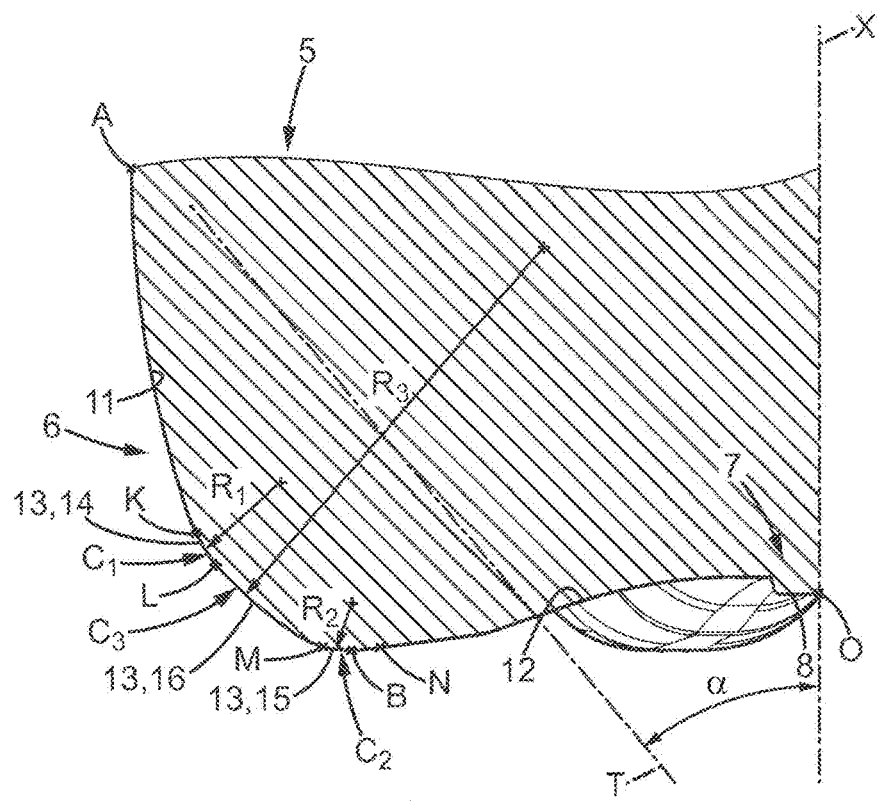
FIG. 4 is a partial cutaway view of the bottom along the axis IV-IV of FIG. 3.
Figure 7:
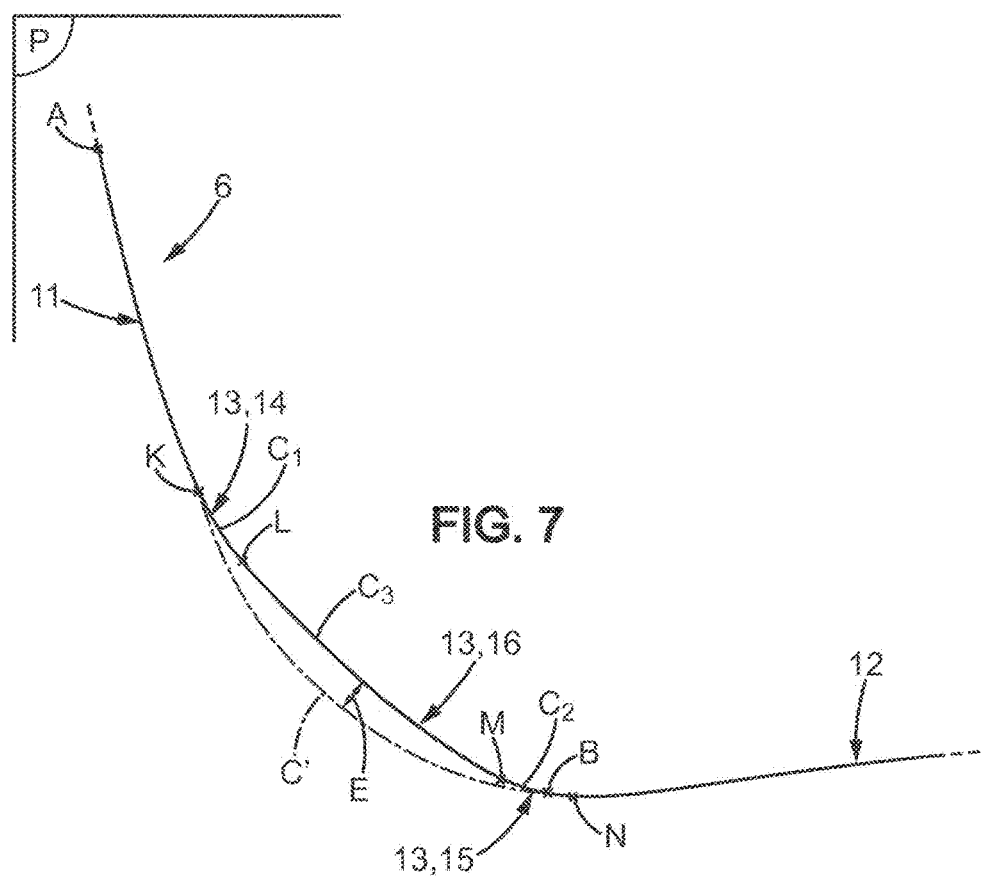
FIG. 7 is a diagrammatic representation superposing a foot of the bottom according to the invention and a foot according to the state of the art, radial cutaway views.

When seen in radial cutaway as in FIG. 4 or FIG. 7, the wall of each foot 6 comprises a peripheral portion 11 connected to the body 2 at the point A and a central portion 12 connected to the central zone 7. The peripheral portion 11 is obtained, for example, by a sweep around the main axis X of a generatrix curve and forms a slightly inclined or curved portion in relation to the longitudinal axis X, toward the center O when the body 2 is removed. The central portion 12 is slightly convex, i.e., retracted toward the interior of the container toward the center O, and joins the central zone 7.

The wall of each foot 6 then comprises a so-called truncated portion 13, extending between the peripheral portion 11 and the central portion 12, and passing through the seat point B. The truncated portion 13 comprises a surface 14 for connecting to the peripheral portion 11, a surface 15 for connecting to the central portion 12, and an intermediate surface 16 that connects the two connecting surfaces 14, 15. Each surface, respectively 14, 15, 16 of the truncated portion 13, can be defined by the rotation of at least one curve, respectively C1, C2 and C3, around an axis.

Each surface, respectively 14, 15, 16, of the truncated portion 13 is formed from at least one so-called generatrix curve, respectively C1, C2 and C3, with a radius of curvature, respectively R1, R2 and R3. More specifically, when seen in radial cutaway, the curve C1 of the surface 14 for connecting to the peripheral portion 11 extends between a point K and a point L, the curve C3 of the intermediate surface 16 extends from the point L to a point M, and the curve C2 of the surface 15 for connecting to the central portion 12 extends from the point M to a point N by passing through the seat point B. The point N can be merged with the point B. The radius R1, R2, R3 of each curve C1, C2, C3 is then the radius that is measured in the radial cross-sectional plane.

The intermediate surface 16 is defined by the rotation of at least one generatrix curve C3, around a truncation axis T, which is different from the main axis X. The truncation axis T is preferably encompassed in the radial plane P of the foot 6 in question. The radius R3 of curvature of the curve C3 is larger than the radii R1 and R2 of curvature of the generatrix curves C1 and C2 of the connecting surfaces 14, 15. The truncation axis T is specific to each foot 6 of the bottom 5. Thus, for each foot 6, a truncation axis T is defined.

Thus, for example, the truncation axis T is an axis that is parallel to the main axis X but separated from the main axis X in the radial plane P of the corresponding foot 6. As a variant, the truncation axis T is inclined in relation to the main axis X.

Figure 5:
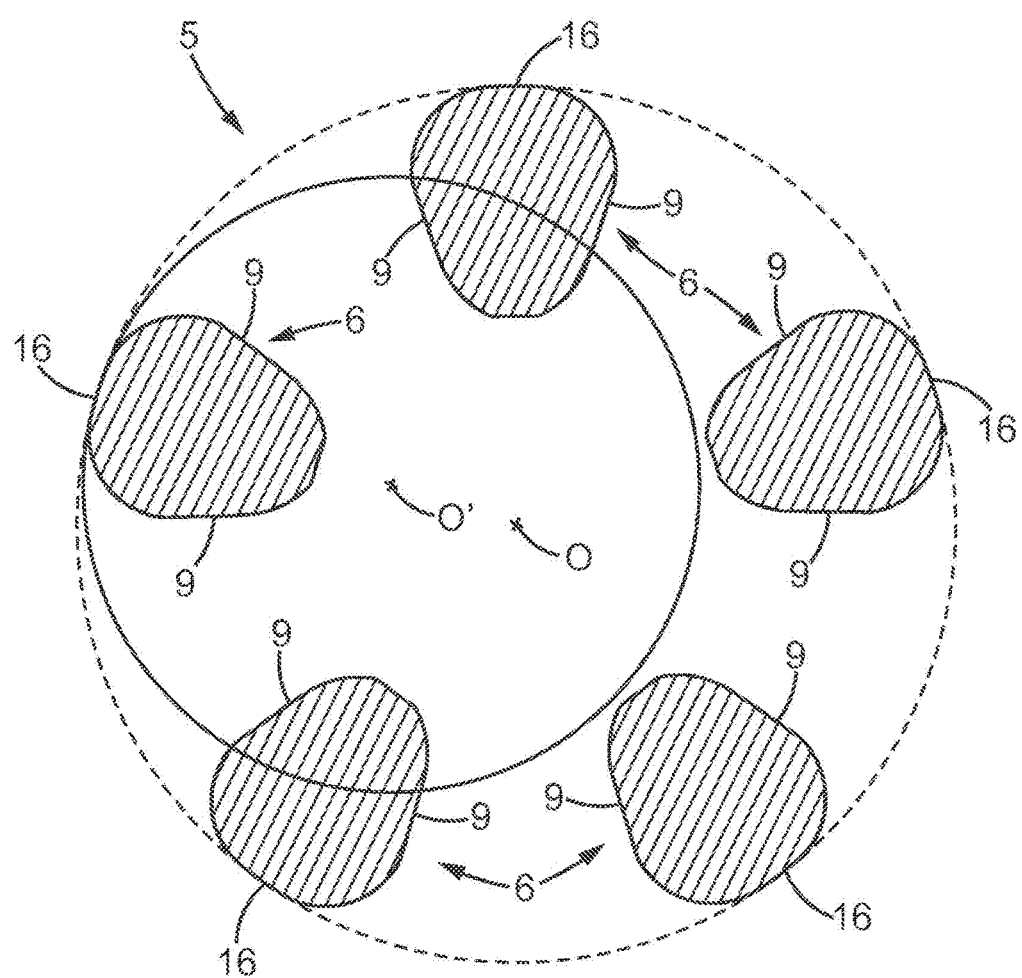
FIG. 5 is a cutaway view of the bottom along a plane that is perpendicular to the axis of the container.

Two circles are shown in FIG. 5, which is a cutaway view in a plane that is perpendicular to the main axis X, in the area of the intermediate surfaces 16 of the feet. The circle in broken lines has its center merged with the center O of the bottom 5, on the main axis X, and passes through the point that is the furthest away radially from the center O of each foot 6. The circle in solid lines shows the co-radial circle with, i.e., the same center and the same diameter as the intermediate surface 16 in this plane for a foot 6, but with the center O' that is different from the center O of the bottom 5. The co-radial circle with the intermediate surface 16 therefore has its center O' on the truncation axis T.

The curves C1, C2, C3 can have a radius R1, R2, R3 of a curvature that may or may not be constant. In this latter case, the smallest radius R3 of curvature that is measured on the curve C3 of the intermediate surface 16 is always larger than the largest radius R1 of curvature that is measured on the curve C1 and the largest radius R2 of curvature that is measured on the curve C2.

The connecting surfaces 14 and 15 make it possible to ensure the continuity between the portions 11, 12 and 13 of the foot 6. They are then obtained by, for example, sweeping their generatrix curve C1, C2 around an axis, which may be different from the truncation axis T, and which is, for example, the main axis X. According to a particular embodiment, the radii R1 and R2 of curvature of the generatrix curves C1 and C2 are constant, in such a way that the connecting surfaces 14, 15 can be likened to fillets between the portions 11, 12 and the intermediate surface 16.

According to an embodiment, the radius R3 of curvature of the generatrix curve C3 of the intermediate surface 16 is at least 10 mm. For example, it is 28 mm. The truncation axis T is inclined by an angle α of inclination in relation to the main axis X, preferably between 0° and 65°, and, for example, 40°. According to a particular embodiment, the radius R3 of curvature of the curve C3 of the intermediate surface 16 is infinite, or almost so: the curve C3 can then be likened to a straight line.

The radius R3 of curvature of the curve C3 is very much larger, preferably in a ratio of at least eight, than the radii of curvature of the curves C1 and C2.

The truncated portion 13 thus formed, and in particular the intermediate surface 16, makes it possible to reduce the radial dimension of the foot by truncating a portion of the foot, on the periphery, while not sacrificing the stability of the container 1.

Figure 6:
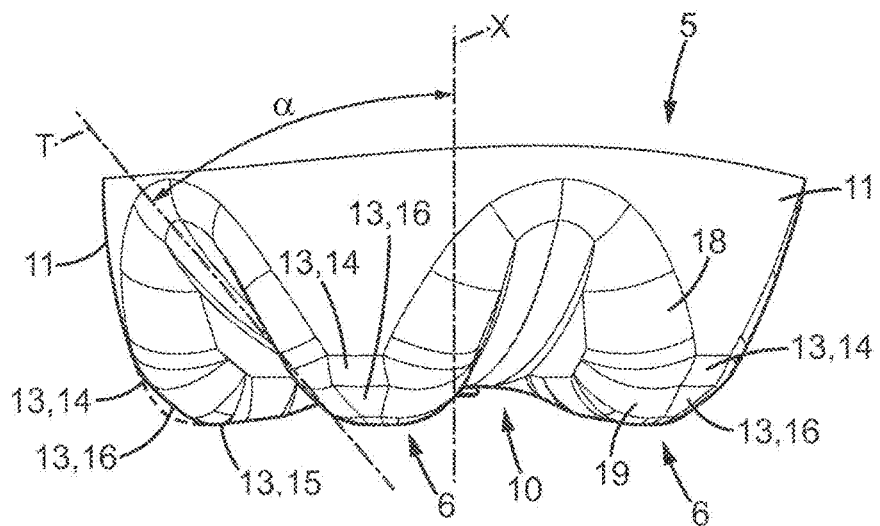
FIG. 6 is a side view of the bottom of FIG. 2.

In FIG. 6, a bottom 5 is shown in accordance with the invention, a foot 6 of which is superposed with a foot of the state of the art, shown in broken lines, with the latter being obtained, in a conventional manner, by rotation of one or more generatrix curves around the main axis X. The truncated portion 13 makes it possible to obtain a radial extension that is decreased in relation to the foot of the state of the art, while preserving the same diameter of the seat circle D. More specifically, and as shown in FIG. 7, the foot of the state of the art leaves from the same junction point A with the body 2 and forms a seat of the same radius, i.e., it passes through the same point B as the foot 6 of the bottom 5 according to the invention. Up to the point K, i.e., on the peripheral portion 11, the profile of the two feet is essentially merged. Then, their profile is separated up to the point B, where they are again merged on the central portion 12. The distance E measured between the profile of the two feet can be several millimeters and offers a certain advantage relative to the blow-moldability of the foot 6 in accordance with the invention. Actually, during the blow molding, the material is to be less stretched in the radial direction to reach the truncated portion 13 than for a foot of the state of the art.

Figure 8:
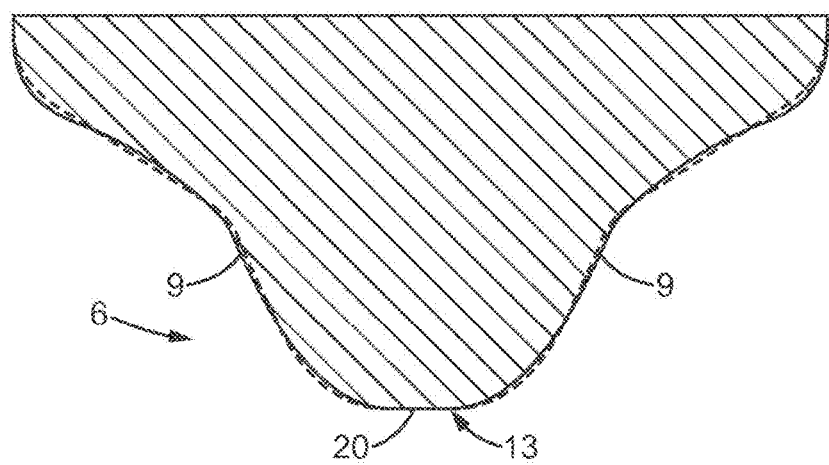
FIG. 8 is a cutaway view, along the axis VII-VII of the bottom of FIG. 3, of a foot of the bottom according to the invention superposed with a similar view of a foot of the state of the art.

In addition, the connecting portions 11 and 12 as well as the truncated portion 13 are connected to the lateral sides 9 by rounded lateral edges, respectively 17, 18, 19, ensuring the continuity between the portions 11, 12 and 13, on the one hand, and the lateral sides 9, on the other hand. Owing to the construction of each foot 6 by the truncation axes T, the lateral edge 19 that connects the truncated portion 13 to a side 9 makes it possible for the profile of the foot 6 in accordance with the invention to approach essentially that of the foot of the state of the art in the area of the seat (FIG. 8). The advantages that are linked to the stability of the bottom are thus preserved.

Figure 9:
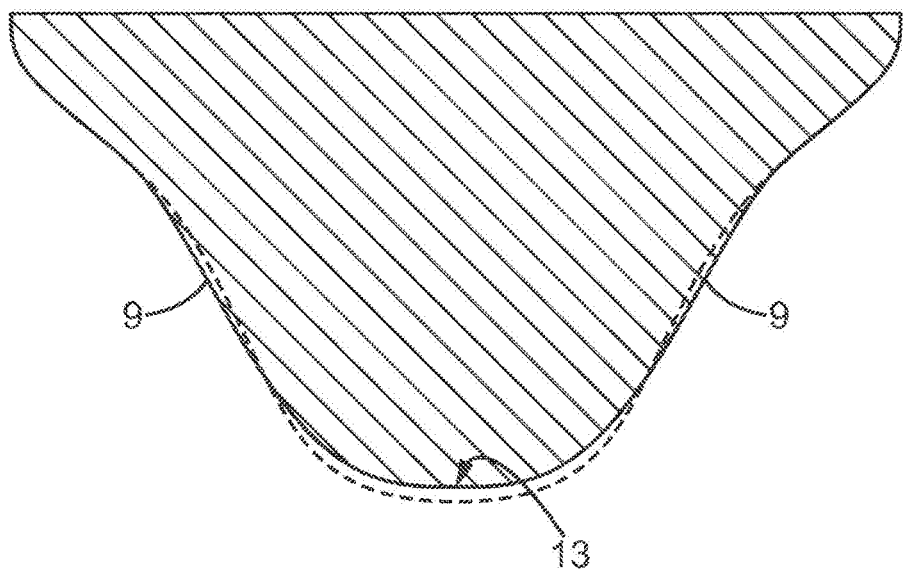
FIG. 9 is a cutaway view, along the axis IX-IX of the bottom of FIG. 3, of a foot of the bottom according to the invention superposed with a similar view of a foot of the state of the art.
Figure 10:
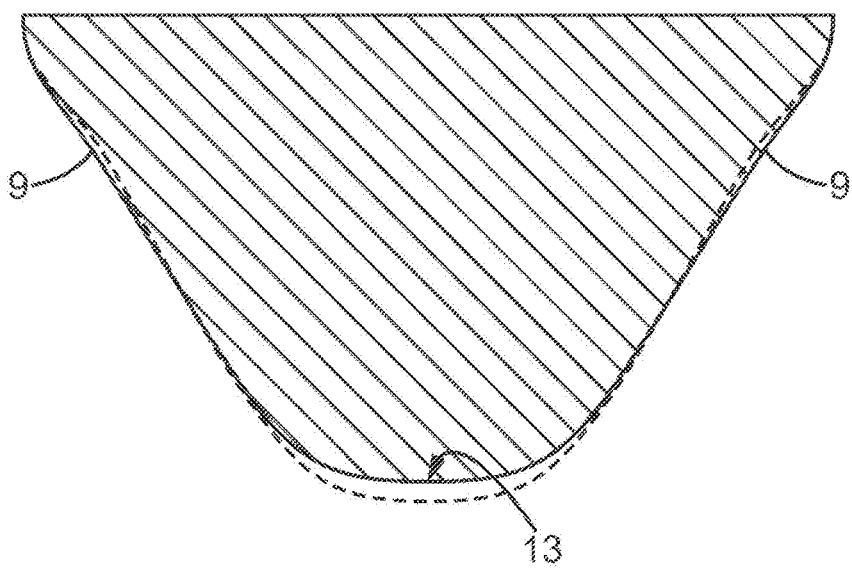
FIG. 10 is a cutaway view, along the axis X-X of the bottom of FIG. 3, of a foot of the bottom according to the invention superposed with a similar view of a foot of the state of the art.

Actually, the contact line 20 between the foot 6 and the placement surface, corresponding to a portion of the seat circle D, is merged with the contact line of the foot of the state of the art. However, the truncated portion 13 allows the foot 6 to move away from the seat surface, i.e., the surface comprising the seat circle D, more quickly when it is removed from the center O of the bottom 5 than the foot of the state of the art. FIGS. 8 to 10 illustrate this result. In FIG. 8, which is a cutaway view in the area of point B of a foot, the profile of the foot 6 according to the invention, shown in solid lines, is essentially merged with that of the foot of the state of the art, shown in broken lines. In FIG. 9, the cutaway is further away from the center O of the bottom 5 than in FIG. 9. The foot 6 according to the invention differs from the foot of the state of the art, and more specifically, the profile of the foot 6 according to the invention is less developed than the foot of the state of the art. In FIG. 10, which is a cutaway that is further away from the center O of the bottom 5 than in FIG. 9, the distance between the two feet is still larger. Thus, the material should there again be less stretched.

Thus, during the blow molding, the material should be less stretched in the two directions perpendicular to the main axis X. In other words, the foot 6 of the bottom 5 according to the invention is closer to the initial preform from which the container is blow molded than the foot of the state of the art. The blow-moldability of the bottom 5 is therefore increased, since the blow-molding time and/or the blow-molding pressure for forming the bottom 5 can be decreased.

In addition, the inclination of the sides 9 in relation to the radial plane P is essentially unchanged in such a way that the rigidity of the bottom is impacted little or not at all by the presence of the truncated portion 13.

In conclusion, the new foot 6 makes it possible to respond both to stresses linked to the blow-moldability of the foot and to stresses linked to the stability. In particular, the truncation portion 13 does not influence the radius of the seat circle D but rather truncates the foot 6 in a substantial manner. The new foot 6, however, preserves the inclination of the lateral sides 9, in particular to avoid decreasing the rigidity.

The invention claimed is:

1. A container (1) made of thermoplastic material that is obtained by blow molding or stretch blow molding of a previously-injected preform, with the container (1) comprising a body (2) extending along a main axis (X) and comprising a petaloid-type bottom (5) that has a central zone (7) from which feet (6) alternating with valleys (10) extend radially, with each foot (6) comprising a peripheral portion (11) connected to the body (2) of the container and a central portion (12) connected to the central zone (7), wherein each foot also has a truncated portion (13), forming a seat for the container (1) and extending between the peripheral portion (11) and the central portion (12), the truncated portion (13) comprising a first connecting surface (14) for connecting to the peripheral portion, a second connecting surface (15) for connecting to the central portion, and an intermediate connecting surface (16) for connecting the first and second connecting surfaces (14, 15), the intermediate connecting surface (16) being defined by the rotation of at least one generatrix curve (C3) around a truncation axis (T) that is different from the main axis (X) and specific to each foot, the radius (R3) of curvature of the curve (C3) of the intermediate connecting surface (16) being larger than the radius (R1, R2) of curvature of generatrix curves (C1, C2) of the first and second connecting surfaces (14, 15), wherein the ratio between the radius (R3) of curvature of the generatrix curve (C3) of the intermediate connecting surface (16) and the radius (R1, R2) of curvature of each generatrix curve (C1, C2) of the first and second connecting surfaces (14, 15) is at least eight.

2. The container (1) according to claim 1, wherein the truncation axis (T) is inclined in relation to the main axis (X).

3. The container (1) according to claim 2, wherein the truncation axis (T) is inclined by an angle ($\alpha$) of inclination in relation to the main axis (X) of between 0° and 65°.

4. The container (1) according to claim 3, wherein the angle ($\alpha$) of inclination is 40°.

5. The container (1) according to claim 1, wherein the radius (R3) of curvature of the generatrix curve (C3) of the intermediate connecting surface (16) is not constant.

6. The container (1) according to claim 1, wherein the radius (R3) of curvature of the generatrix curve (C3) of the intermediate connecting surface (16) is at least 10 mm.

7. The container (1) according to claim 1, wherein the radius (R3) of curvature of the generatrix curve (C3) of the intermediate connecting surface (16) is 28 mm.

8. The container according to claim 1, wherein the radius (R3) of curvature of the generatrix curve (C3) of the intermediate connecting surface (16) is infinite, with the generatrix curve (C3) of the intermediate connecting surface (16) being considered to be a straight line.

9. The container (1) according to claim 2, wherein the radius (R3) of curvature of the generatrix curve (C3) of the intermediate connecting surface (16) is not constant.

10. The container (1) according to claim 2, wherein the radius (R3) of curvature of the generatrix curve (C3) of the intermediate connecting surface (16) is at least 10 mm.

11. The container (1) according to claim 2, wherein the radius (R3) of curvature of the generatrix curve (C3) of the intermediate connecting surface (16) is 28 mm.

12. The container according to claim 2, wherein the radius (R3) of curvature of the generatrix curve (C3) of the intermediate connecting surface (16) is infinite, with the generatrix curve (C3) of the intermediate connecting surface (16) being considered to be a straight line.

* * * * *